United States Patent [19]

Gruber

[11] Patent Number: 5,597,811
[45] Date of Patent: Jan. 28, 1997

[54] OXIRANE CARBOXYLIC ACID DERIVATIVES OF POLYGLUCOSAMINES

[75] Inventor: James V. Gruber, Somerville, N.J.

[73] Assignee: Amerchol Corporation, Edison, N.J.

[21] Appl. No.: 416,139

[22] Filed: Apr. 10, 1995

[51] Int. Cl.$^6$ .......................... A61K 31/70; C07B 37/08
[52] U.S. Cl. ................. 514/55; 514/54; 514/62; 536/18.7; 536/20
[58] Field of Search .............. 536/20, 18.7; 514/54, 514/55, 62

[56] References Cited

U.S. PATENT DOCUMENTS

| | | | |
|---|---|---|---|
| 2,795,579 | 6/1957 | Docri | 260/211 |
| 3,879,376 | 4/1975 | Vanlerberghe et al. | 260/211 |
| 3,953,608 | 4/1976 | Vanlerberghe et al. | 424/361 |
| 4,031,025 | 6/1977 | Vanlerberghe et al. | 252/180 |
| 4,336,070 | 6/1982 | Koshugi | 106/122 |
| 4,365,050 | 12/1982 | Ivani | 527/312 |
| 4,424,346 | 1/1984 | Hall et al. | 536/20 |
| 4,528,283 | 7/1985 | Lang et al. | 514/55 |
| 4,532,267 | 7/1985 | Allan | 523/106 |
| 4,542,014 | 9/1985 | Bresak et al. | 424/70 |
| 4,574,150 | 3/1986 | Austin | 536/20 |
| 4,613,502 | 9/1986 | Turkova et al. | 424/94 |
| 4,619,995 | 10/1986 | Hayes | 536/20 |
| 4,659,700 | 4/1987 | Jackson | 514/55 |
| 4,772,689 | 9/1988 | Lang et al. | 536/20 |
| 4,774,091 | 9/1988 | Yamahira et al. | 424/426 |
| 4,780,310 | 10/1988 | Lang et al. | 424/47 |
| 4,921,949 | 5/1990 | Lang et al. | 536/20 |
| 4,929,722 | 5/1990 | Partain, III et al. | 536/20 |
| 4,946,870 | 8/1990 | Partain, III et al. | 514/777 |
| 4,973,680 | 11/1990 | Billmers | 536/58 |
| 4,997,643 | 3/1991 | Partain, III et al. | 424/78 |
| 5,378,472 | 1/1995 | Muzzarelli | 424/445 |

FOREIGN PATENT DOCUMENTS

| | | |
|---|---|---|
| 0198246 | 10/1986 | European Pat. Off. . |
| 106409 | 6/1989 | Japan . |
| 2107340 | 10/1981 | United Kingdom . |

OTHER PUBLICATIONS

T. Yui et al., "Molecular and Crystal Structure of the Anhydrous Form of Chitosan", *Macromolecules* 1994, 27, 7601–7605.

K. Mazeau et al., "Molecular and Crystal Structure of a High–Temperature Polymorph of Chitosan from Electron Diffraction Data", *Macromolecules* 1994, 27, 7606–7612.

*Primary Examiner*—Elli Peselev
*Attorney, Agent, or Firm*—W. K. Volles

[57] ABSTRACT

Polyglucosamine derivatives, e.g., chitosan, substituted with oxirane carboxylic acids, e.g., epoxysuccinic acid, are disclosed. The polyglucosamine derivatives can be prepared in a covalently bonded or ionically bonded form. Methods for preparing the polyglucosamine derivatives are disclosed as well as compositions containing the derivatives and uses for the derivatives.

16 Claims, No Drawings

OXIRANE CARBOXYLIC ACID DERIVATIVES OF POLYGLUCOSAMINES

FIELD OF THE INVENTION

The present invention relates to derivatives of polyglucosamines, and more specifically relates to oxirane carboxylic acid derivatives, e.g., epoxysuccinic acid, of polyglucosamines, e.g., chitosan.

BACKGROUND OF THE INVENTION

Polyglucosamines are polysaccharides having glucose monomer units with amine functionality in the polysaccharide backbone. Typical polyglucosamines include, for example, chitin, chitosan, and polyglucosaminoglycans which are copolymers of N-acetylglucosamine and various glycan sugars, e.g., hyaluronic acid, chondroitin, heparin, keratan and dermatan.

Chitin and chitosan are commonly used polyglucosamines. Chitin is a glucosamine polysaccharide which contains nitrogen and is structurally similar to cellulose. Chitin is a principle substituent of the shells of various crustaceans such as shrimps, crabs and lobsters. It is also found in some fungi, algae, insects and yeasts. Chitin is not one polymer with a fixed stoichiometry but a class of polymers of N-acetylglucosamine with different crystal structures and degrees of deacetylation and with fairly large variability from species to species. Chitosan is a generic term for a deacetylated derivative of chitin. Generally speaking, chitosan is a water-insoluble random copolymer of beta-1,4-glucosamine and N-acetyl-beta-1,4-glucosamine. Typically, the degree of deacetylation in the chitosan is about 70–100 percent, although deactylation values as low as 50 percent have been produced commercially.

Both chitin and chitosan are insoluble in water, dilute aqueous bases and most organic solvents. However, unlike chitin, chitosan is soluble in dilute aqueous acids, e.g., carboxylic acids, as the chitosan salts. Solubility in dilute aqueous acid is therefore a simple way to distinguish chitin from chitosan.

Chitosan is unique in that it is a polysaccharide which contains primary amine groups. Chitosan and its derivatives are therefore often used as materials in metal recovery, ion exchange resins, surgical dressings and sutures, ocular bandages and lenses, and other applications in the biomedical field. Chitosan forms water soluble salts with many organic and inorganic acids and these chitosan salt derivatives are also often used in biomedical applications.

Although polyglucosamine salts such as, for example, chitosan salts have been found to be very useful, such salts can have functional drawbacks when the pH of the system in which they are employed rises above the isoelectric point of the polyglucosamine. At this pH, (typically at pH greater than 7.0), the salt becomes the free amine and consequently water-insoluble.

In order to circumvent the difficulties associated with the water-insolubility of polyglucosamines, the polyglucosamines can be derivatized with a variety of hydrophilic electrophiles to disrupt the secondary crystal structure of the polyglucosamines and allow the polymer to dissolve more easily into aqueous solutions. Some of the known reagents used to make such derivatives of chitosan, include for example, ethylene and propylene oxide, quaternary ammonium reagents, monochloroacetic acid and various anhydrides. The preparation of some of these derivatives can require the use of special equipment to handle high vapor pressure materials, such as ethylene oxide, highly corrosive materials, such as strong acids and bases, the isolation and control of undesirable reactants, solvents and by-products, such as alkylene glycols, toluene, monochloroacetic add and anhydrides.

Although polyglucosamine derivatives, such as, for example, the chitosan derivatives described above are commercially useful and desirable materials, new polyglucosamine derivatives are desired which are water-soluble, have desirable properties and can be prepared with conventional equipment and less toxic reactants.

SUMMARY OF THE INVENTION

The present invention provides polyglucosamine derivatives which are substituted with oxirane carboxylic adds such as, for example, epoxysuccinic acid.

By the present invention, it is now possible to provide water-soluble polyglucosamine derivatives in both the covalently bonded and ionically bonded form. Moreover, the polyglucosamine derivatives of the present invention are amphoteric and can contain multiple functional groups. As a result, these derivatives can have enhanced reactivity, e.g., as metal chelating agents, as well as enhanced performance in cosmetic and biomedical applications.

DETAILED DESCRIPTION OF THE INVENTION

The polyglucosamines suitable for use in the present invention are polysaccharides having glucose monomer units with amine functionality in the saccharide backbone. It is desirable that the polyglucosamines contain free amine groups and preferably a sufficient amount of free amine groups to promote covalent bonding with the oxirane carboxylic acids (hereinafter described). As used herein, the term "free amine" means amine groups which are nucleophilic, i.e., capable of forming a covalent bond with an electrophile. More preferably, the free amine groups are primary amine groups. It is also preferred that at least 50 percent, and more preferably at least 70 to 95 percent, of the amine groups in the polyglucosamine are free amines.

The molecular weight of the polyglucosamines suitable for use in accordance with the present invention typically ranges from about 1000 to 3,000,000 grams per gram mole, preferably from about 10,000 to 1,000,000 grams per gram mole, and more preferably from about 10,000 to 750,000 grams per gram mole. As used herein, the term "molecular weight" means weight average molecular weight. Methods for determining the weight average molecular weight of polyglucosamines are known to those skilled in the art. Typical methods include, for example, light scattering, intrinsic viscosity, and gel permeation chromatography. The determination of weight average molecular weight by gel permeation chromatography is preferred in accordance with the present invention. The viscosity of the polyglucosamines suitable for use in accordance with the present invention typically ranges from about 1.1 to 10,000 centipoise and preferably from about 1.1 to 2000 centipoise. Unless otherwise indicated as used herein the term "viscosity" refers to the viscosity of a 1.0 weight percent dilute aqueous acid solution of the polyglucosamine measured at 25° C. with a Brookfield viscometer. Such viscosity measuring techniques are known to those skilled in the art.

Examples of polyglucosamines suitable for use in accordance with the present invention, include for example, chitin, chitosan, hyaluronic acid, heparin, chondroitin, e.g., as chondroitin sulfate, keratan, e.g., as keratan sulfates, and dermatan, e.g., as dermatan sulfate. Chitosan is a preferred polyglucosamine suitable for use in accordance with the present invention. Typically, the polyglucosamines are at least partially deacetylated to provide free amine groups. The degree of deacetylation of the polyglucosamines is preferably from about 50 to 100 percent, more preferably from about 70 to 99 percent and most preferably from about 75 to 95 percent. Methods for deacetylating polyglucosamines are known to those skilled in the art. In addition such deacetylated polyglucosamines are commercially available.

The oxirane carboxylic acids suitable for use in accordance with the present invention, contain an epoxide group, at least one acid group and have from about 3 to 18 carbon atoms, or more, per molecule. Preferably, the oxirane carboxylic acid contains from 3 to 6 carbon atoms per molecule, and more preferably is a dicarboxylic acid. Other preferred oxirane carboxylic acids include cis-epoxysuccinic acid and trans-epoxysuccinic acid, with cis-epoxysuccinic acid being especially preferred. Methods for the preparation of oxirane carboxylic acids suitable for use in accordance with the present invention are known to those skilled in the art. In addition, such materials are commercially available.

In accordance with the present invention the oxirane carboxylic acid is preferably substituted onto the free amine of the polyglucosamine. More preferably, substitution of the oxirane carboxylic acid onto the hydroxyl groups of the polyglucosamines is substantially avoided, i.e., preferably less than 10 percent and more preferably less than 2 percent of the hydroxyl groups on the polyglucosamine are substituted with the oxirane carboxylic acid. Preferably, an effective amount of oxirane carboxylic acid is substituted onto the polyglucos-amines to achieve the desired properties of the polyglucos-amine derivative. As used herein, the term "molar substitution", also referred to as "MS", means the moles of oxirane carboxylic acid substituted on the polyglucosamine per mole of glucosamine monomer unit. Preferably, the polyglucosamine derivatives of the present invention have a MS of from about 0.03 to 1.0 and more preferably from about 0.2 to 1.0 moles of the oxirane carboxylic acid per mole of glucosamine monomer unit.

Quite advantageously in accordance with the present invention, the oxirane carboxylic acid derivatives can be prepared in either salt form, i.e., ionically bonded, or in the covalently bonded form. The covalently bonded polyglucosamine derivatives of the present invention can be represented by the following schematic:

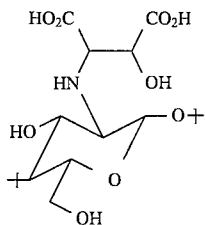

The ionically bonded polyglucosamine derivatives of the present invention can be represented by the following schematic:

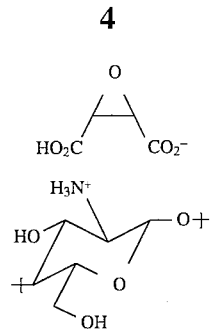

In addition to the above-described polyglucosamine derivatives, further modified polyglucosamines may be prepared which also contain other substituent groups, such as hydroxyalkyl ether groups (e.g., hydroxyethyl or hydroxypropyl ether groups), carboxyalkyl ether groups (e.g., carboxymethyl groups), amide groups (e.g., succinyl groups), ester groups (e.g., acetate groups) or amino groups [e.g., 3-(trimethylammonium chloride)-2-hydroxypropyl or 3-(dimethyloctadecyammounium chloride)-2-hydroxpropyl ether groups] in addition to the epoxysuccinic acid groups. These other substituent groups may be introduced prior to or subsequent to the reaction with the epoxysuccinic acid, or introduced simultaneously by reaction of the polyglucosamine salt with the epoxysuccinic acid and the other derivatizing reagent. Those skilled in the art will recognize that any esterification reactions should be carried out after other derivatizing reactions in order to avoid hydrolysis of the ester under the alkaline conditions required to form the derivatives of the present invention.

Additionally, those skilled in the art will recognize that the polyglucosamine derivatives of the present invention can be further modified with any of a number of amine or hydroxyl reactive crosslinking agents including, but not limited to formaldehyde, epichlorohydrin, or other difunctional crosslinking agents, or by functional crosslinking using a polyvalent metal ion, such as for example, calcium or aluminum which crosslinks the derivative through ionic interactions with the dicarboxylate functionality of the present invention. Furthermore, those skilled in the art will recognize that the derivatives of the present invention can be modified further by standard reactions known to those skilled in the art including, but not limited to formation of carboxylic acid salts (e.g., sodium, potassium or calcium), carboxylate esters, amides, or anhydrides, and amine salts made by acidification of the derivative with any of a variety of organic or mineral acids (e.g., HCl, $H_3PO_4$, acetic, glycolic, lactic or pyrrolidone carboxylic).

The polyglucosamine derivatives of the present invention are water soluble. As used herein the term, "water-soluble" means that at least one gram and preferably at least 2 grams, of the polyglucosamine derivative are soluble in 100 grams of water at 25° C. and one atmosphere. The extent of water solubility can be varied by adjusting the extent of the oxirane carboxylic acid substitution on the polyglucosamine. Such techniques for adjusting the water solubility are known to those skilled in the art.

The ionically bonded form of the polyglucosamine derivatives of the present invention can be prepared in accordance with known methods for preparing polyglucosamine salts such as chitosan salts. In general, the polyglucosamine is slurried, but not dissolved, in an aqueous solvent, e.g., from about 5 to 50 percent water. Typical solvent materials include for example, ketones, such as acetone, alcohols such as methanol, ethanol, N-propanol, isopropanol, t-butanol, and various other solvents such as for example, acetonitrile, tetrahydrofuran, dioxane, 2-ethoxyethanol, dimethoxyethane, and the like. Then, the oxirane carboxylic acid is added to the slurry in an amount of from about a 0.5 to 5 fold excess, preferably about a 0.5 to 3 fold excess of the desired degree of substitution. The addition of the oxirane carboxylic acid is preferably conducted in the liquid phase at a temperature of from about room temperature to 100° C., more preferably from about 35° to 80° C., and most preferably, from about 45° to 75° C. The pressure at which the oxirane carboxylic acid is introduced is not critical and typically ranges from about 0 to 1000 psig. Typical reaction times for preparing the salt range from about 30 minutes to 5 hours preferably from about 30 minutes to 2 hours, and more preferably from about 30 minutes to 1 hour. The resulting polyglucosamine salt can be isolated by filtration, washing and extraction. Further details concerning the preparation method described above are known to those skilled in the art. See for example U.S. Pat. No. 4,929,722 assigned to Union Carbide Chemicals and Plastics Company Inc.

Although the polyglucosamine salts prepared in accordance with the present invention can be used for virtually all known applications for which chitosan salts, for example, are used, including but not limited to biomedical applications, such as burn treatment and topical medical formulations for rashes and fungal infections, the polyglucosamine salts of the present invention can also be utilized as reactive intermediates in the preparation of covalent derivatives of polyglucosaminese The covalently bonded polyglucosamine derivatives of the present invention can be made in accordance with methods known to those skilled in the art provided that the oxirane carboxylic acid is reactive under the conditions of the process. Some known methods for making derivatives of polyglucosamines include the above referenced U.S. Pat. No. 4,929,722, U.S. Pat. No. 4,424,346 assigned to Canadian Patents and Development Ltd., U.S. Pat. No. 4,619,995 assigned to Nova Chem Limited, and U.S. Pat. No. 4,780, 310 assigned to Wella Akiengesellschaft.

Preferably however, the covalently bonded polyglucosamine derivatives of the present invention are prepared in accordance with the following procedure.

The starting material is a polyglucosamine salt which can be made from a variety of known acids including but not limited to formic, acetic, N-acetylglycine, acetylsalicylic, fumaric, glycolic, iminodiacetic, itaconic, DL-lactic, maleic, DL-malic, nicotinic, 2-pyrrolidone-5-carboxylic, salicylic, succinamic, succinic acid, ascorbic, aspartic, glutamic, glutaric, malonic, pyruvic, sulfonyldiacetic, thiodiacetic and thioglycolic acids, as well as various mineral acids including but not limited to, hydrochloric, sulfuric and phosphoric, etc. Preferred salts include for example, chitosan lactate available from Amerchol Corporation, Edison, N.J. as Kytamer L® and chitosan pyrrolidone carboxylate also available from Amerchol Corporation as Kytamer PC®. Especially preferred polyglucosamine salts are the oxirane carboxylic acid salts described herein, such as, for example, the cis-epoxysuccinic salt of chitosan.

The salt is combined either as an aqueous slurry, a slurry in an aqueous organic solvent, or preferably as a substantially dry powder to an aqueous medium comprising caustic to form a slurry of the polyglucosamine salt in the aqueous medium. The selection of the caustic is not critical and caustics such as, for example, sodium hydroxide or potassium hydroxide can be utilized. The concentration of the caustic in the aqueous medium is typically from about 1 to 50 weight percent, preferably from about 2 to 25 weight percent, and more preferably from about 3 to 10 weight percent caustic, i.e, a dilute caustic medium. The amount of caustic added should be sufficient to neutralize the carboxylic acid groups of the oxirane carboxylic acid to be introduced subsequently as well as the acid groups on the polyglucosamine salt. After neutralization, the reaction mixture is a swollen slurry of the polyglucosamine at a pH of from about 7.7–14.0, preferably from about 9.0–12.0. If the epoxysuccinic salt of the polyglucosamine is used as the starting polymer, the minimum requirement of 3 equivalents of caustic can be reduced because, in this case, a portion of the salt has already been neutralized by the polyglucosamine. The addition of the polyglucosamine salt to the dilute caustic medium is done under stirring conditions and preferably in the liquid phase for a time period of from about 1–3 hours and preferably about 1 hour. The temperature and pressure used during this initial step to swell the polymer are typically from about room temperature to 100° C. and atmospheric pressure, respectively. although neither the temperature nor the pressure is critical for this step.

After the initial swelling of the polymer in the dilute caustic medium an appropriate amount of the oxirane carboxylic acid is added to the swollen polyglucosamine dilute caustic medium in order to achieve the desired molar substitution of the oxirane carboxylic acid on the polyglucosamine. Typically, the amount of oxirane carboxylic acid introduced will range from about 0.05 to 5 moles, and more preferably from about 0.5 to 3 moles of oxirane carboxylic acid per mole of glucose amine monomer unit. Those skilled in the art will recognize that the amount of oxirane carboxylic acid required to be added to conduct the covalent substitution will be lower in the case where the oxirane carboxylic acid salt is used as a starting material. The covalent substitution is accomplished by maintaining the mixture at a temperature of less than about 200° C., preferably from about 30° to 150° C. and more preferably from about 80° to 100° C., e.g., by heating. The pressure to effect the substitution is not critical; provided, however, that it is preferred to maintain the system in the liquid phase. The reaction is conducted for a time period of from about 1–48 hours and more typically from about 8–24 hours.

In accordance with the preferred preparation method of the present invention, the covalently bonded polyglucosamine derivative dissolves into the reaction medium upon formation. As this occurs, the viscosity of the reaction medium increases with higher molecular weight polyglucosamines giving higher viscosity solutions. The dissolution of the reaction product provides a convenient means for determining when the reaction is complete. Alternatively, the extent of reaction can be determined by methods known to those skilled in the art such as infra red analysis or gas chromatography. Upon completion of the reaction, the reaction mixture is cooled down preferably to room temperature, i.e. about 25° to 30° C.

In a preferred aspect of the invention, the reaction mixture is then neutralized with an acid such as for example, acetic acid, lactic acid or similar acids or, preferably, tartaric acid which is the hydrolysis by-product of the oxirane carboxylic acid used to make the derivative.

The product can be used directly upon completion of the reaction or after neutralization or after partial or complete isolation of the covalently bonded polyglucosamine derivative from the reaction product mixture. Accordingly, the reaction product comprises a composition containing from about 0.1 to 99 weight percent of the polyglucosamine derivative and from about 0.1 to 99 weight percent of an organic acid by-product from the reaction. These acids are typically the acids from the polyglucosamine salt starting material and from the oxirane carboxylic acid. Often, the acids are selected from the group consisting of tartaric acid, lactic acid, acetic acid, glycolic acid, pyrrolidone carboxylic acid or salts thereof and mixtures of these acids or salts or both. Depending upon the extent of isolation of the polyglucosamine derivative, the composition may further comprise from about 0.1 to 90 weight percent, often from about 10 to 80 weight percent water based on the total weight of the composition. Typically, the composition comprises from about 0.05 to 30 weight percent of the polyglucosamine derivative, from about 0.01 to 15 weight percent of the above mentioned acids and from about 55 to 99.94 weight percent water.

Residual by-products from the reaction may include, for example, the sodium salt of the initial polyglucosamine starting material, residual inorganic salts, e.g., NaCl, KCl, NaOH and the like, low molecular weight aminoglucans and residual tartaric acid. Tartaric acid is a non-toxic, naturally occurring hydroxy acid. An advantage of starting the reaction with polyglucosamine, oxirane carboxylic acid salt, e.g., chitosan epoxysuccinate is the presence of the corresponding acid, e.g., tartaric acid, as a residual by-product at completion of the reaction. By employing chitosan epoxysuccinate, for example, initially in the reaction, the problem of additional residual organic acids is minimized and the major contaminants become the innocuous inorganic salts. Under such conditions, the product might be manufactured and used as a solution containing the acid salts.

When it is desired to isolate the polyglucosamine derivative, a variety of options known to those skilled in the art exist. One for example is by the addition of an organic solvent, e.g., acetone or 2-propanol to force the precipitation of the polymer. Another more preferred method is to isolate the polymer by passing the neutralized reaction product mixture through a membrane. Such membrane separations include, for example, ultra filtration, micro filtration, reverse osmosis, nano filtration, dialysis or electrodialysis. Details concerning such membrane technology are known to those skilled in the art.

The final product can be concentrated and used as a solution or dried to a powder by lyophilization, spray drying, drum drying or any of a number of additional methods of drying such aqueous solutions known those skilled in the art. The polyglucosamine derivatives of the present invention can be described as a substituted polymeric aminoacid, an anionic ethoxylated polyglucosamine, a polymeric alpha-hydroxy acid or an amphoteric polyglucosamine dicarboxylic acid.

The polyglucosamine derivatives of the present invention will have a variety of uses, including, but not limited to, neutraceuticals, pharmaceuticals, cosmetics and therapeutics, as well as, in various industrial applications including, for example, water treatment, detergents, or adsorption, metal complexation, paper flocculation, textile sizing, membrane applications such as food coatings and gas separations, and as solid supports for chromatographic stationary phases.

A preferred end-use application for polyglucosamine derivatives of the present invention is as a component in a personal care composition, e.g., skin creams, lotions, cleansing products, conditioners, hairsprays, mousses, gels and the like, which comprises the polyglucosamine derivative and other personal care ingredients. As used herein, the term "personal care ingredients" includes, but is not limited to, active ingredients, such as, for example, spermicides, virucides, analgesics, anesthetics, antibiotic agents, antibacterial agents, antiseptic agents, vitamins, corticosteroids, antifungal agents, vasodilators, hormones, antihistamines, autacoids, kerolytic agents, anti-diarrhea agents, anti-alopecia agents, anti-inflammatory agents, glaucoma agents, dry-eye compositions, wound healing agents, anti-infection agents, and the like, as well as solvents, diluents and adjuvants such as, for example, water, ethyl alcohol, isopropyl alcohol, higher alcohols, glycerine, propylene glycol, sorbitol, preservatives, surfactants, menthol, eucalyptus oil, other essential oils, fragrances, viscosity adjusters and the like. Such personal care ingredients are commercially available and known to those skilled in the art.

The amount of the polyglucosamine derivatives present in the personal care composition will vary depending upon the particular care composition. Typically, however, the personal care composition will comprise from about 0.1 to 99 weight percent of the polyglucosamine derivative of the present invention.

Typical formulations may contain, for example, 90 weight percent of the polyglucosamine derivative. Often, the concentration of the polyglucosamine derivative in the personal care composition will range from about 0.5 to 50 weight percent, and more often from about 0.5 to 10 weight percent based on the personal care composition.

Typical cleansing systems may contain water and a surfactant, like ammonium lauryl sulfate and ammonium laureth sulfate and, auxiliary surfacts like lauramide DEA or coco betaines, thickening agents like NaCl, hydroxypropyl cellulose or PEG-120 methyl glucose dioleate, pH adjusters like citric acid or triethylamine and a chelating agent like tetrasodium EDTA. Likewise, bar soaps may contain surfactants like tallowate or cocoate and a feel modifier like glycerin.

Typical areosol and non-areosol hairsprays may contain a solvent like a low molecular weight alcohol and, or water, a propellent like dimethylether or a hydrocarbon, a resin like poly(vinylpyrrolidone)/vinyl acetate copolymer and, or poly(vinylmethacrylate)/methacrylate copolymer, a plasticizer like dimethicone copolyol and a neutralizing agent like aminomethyl propanol.

Typical creams may contain an oil like mineral oil, water, an emulsifier like methyl glucose sesquistearate or PEG-20 methyl glucose sesquistearate, a feel modifier like isopropyl palmitate or PEG-20 methyl glucose distearate, a polyhydridic alcohol like methyl gluceth-20 and a stabilizer like carbomer.

Typical mousses may contain a solvent like water and, or alcohol, a surfactant like oleth-10, a feel modifier like isopropyl palmitate and a resin like polyquaternium-10 or poly(vinylmethacrylate)/methacrylate copolymer.

Typical gels may contain a viscosifying agent like carbomer, a solvent like water and, or alcohol, a styling resin like poly(vinylmethacrylate)/vinylmethacrylate copolymer, a neutralizing agent like aminomethyl propanol and a feel modifier like methyl gluceth-20.

Further details concerning the ingredients, amounts of ingredients and preparation methods of personal care compositions such as described above are known to those skilled in the art. See, for example, the above referenced U.S. Pat. No. 4,780,310.

The following examples are provided for illustrative purposes and are not intended to limit the scope of the claims which follow.

The following ingredients were used in the examples:

2-propanol—available from Aldrich Chemical Co., Milwaukee, Wis.

Chitosan-1—a low molecular mass material ($M_r \sim 70{,}000$) available from Fluka, Ronkonkoma, N.Y.

cis-epoxysuccinic acid—available from TCI America, Portland, Oreg.

NaOH—sodium hydroxide available from J. T. Baker, Phillipsburg, N.J.

tartartic acid—available from Aldrich Chemical Co., Milwaukee, Wis.

Kytamer® L—chitosan lactate having a weight average molecular weight of 300,000 to 750,000 grams per mole available from Amerchol Corporation, Edison, N.J.

acetic acid—available from Aldrich Chemical Co., Milwaukee, Wis.

trans-epoxysuccinic acid—available from TCI America, Portland, Oreg.

fumaric acid—available from Aldrich Chemical Co., Milwaukee, Wis.

maleic acid—available from Aldrich Chemical Co., Milwaukee, Wis.

Chitosan-2—A medium molecular mass ($M_r \sim 750{,}000$) material available from Fluka, Ronkonkoma, N.Y.

Polymer JR®—a cationic cellulosic available from Amerchol Corporation, Edison, N.J.

HCl—hydrochloric acid available from J. T. Baker, Phillipsburg, N.J.

EXAMPLE 1

Chitosan cis-epoxysuccinate

One hundred and fifty milliliters (ml) of 2-propanol and 75 ml of water were combined into a 500 ml roundbottom flask. Then 12.2 (0.075 mol) of Chitosanol was slurried into the aqueous medium by agitation with a stirrer. To the slurry was added 10.0 g (0.075 mol) of cis-epoxysuccinic acid and the reaction mixture was warmed to 75° C. for one hour. The slurry temperature was lowered to 25° C. and the product was filtered. The resulting chitosan salt was washed with 300 ml of 2-propanol. The resulting chitosan cake was extracted in a Soxhlet extractor with 2-propanol for 24 hours. After drying, the product weight had increased to 18.7 g indicating 6.5 g of the cis-epoxysuccinic acid had reacted with available chitosan amine.

EXAMPLE 2

N-[(2-hydroxy-1,2-dicarboxy)ethyl]chitosan

To a 500 ml roundbottom flask was charged 216 g of a 5 weight percent aqueous NaOH solution. To this solution was added 15.0 g of the chitosan epoxysuccinate from Example 1, and the slurry was agitated for one hour to allow the polymer to swell. Then, 11.2 g of cis-epoxysuccinic acid was added (total epoxide 0.12 mol, 2.0 equivalents). The heterogeneous mixture was heated to a temperature of 100° C. and refluxed for 24 hours. As the reaction progressed, the covalently bonded chitosan derivative went into solution.

The resulting homogeneous solution was cooled to 25° C. and the pH of the reaction mixture was adjusted to 8.5 by addition of 15 weight percent aqueous tartaric acid solution. The product mixture was filtered to remove 4.2 g of insoluble residue. The filtrate, which contained the product and residual tartaric acid salts, was dialyzed [Spectrum, 500 molecular weight cutoff (MWC)] against distilled water for 24 hours. The product was isolated by freeze-drying to afford 10.3 g of N-[(2-hydroxy-1,2-dicarboxy)ethyl]chitosan as pale yellow flakes.

EXAMPLE 3

N-[(2-hydroxy-1,2-dicarboxy)ethyl]chitosan

To 396 g of a 5 weight percent aqueous NaOH solution in a 1000 ml roundbottom flask was slurried 25.0 g of Kytamer® L. The slurry was agitated for 1 hour, whereupon 26.0 g of cis-epoxysuccinic acid was added and the heterogeneous mixture was heated to 90° C. for 36 hours.

The resulting homogeneous solution was cooled to 25° C. and the pH was adjusted to 8.5 using 50 weight percent aqueous acetic acid. The solution was filtered to remove 1.5 g of insoluble residue and the resulting filtrate was dialyzed (Spectrum, 1000 MWC) against distilled water for 24 hours. The product was isolated by freeze-drying to afford 24.3 g of N-[(2-hydroxy-1,2-dicarboxy)ethyl]chitosan as clear, off-white flakes.

EXAMPLE 4

N-[(2-hydroxy-1,2-dicarboxy)ethyl]chitosan

Following the procedure outlined in Example 3, a similar reaction was run, but trans-epoxysuccinic acid was substituted for the cis-epoxysuccinic acid. After 36 hours of heating at reflux the reaction mixture was still heterogeneous. After cooling and working the reaction up as described in Example 3, 3.5 g of soluble product was isolated after freeze-drying. The bulk of the reaction mixture remained insoluble.

CONTROL EXAMPLE 5

Attempted reaction of chitosan lactate and fumaric acid

Following the procedure outlined in Example 3, 25.0 g of Kytamer L (chitosan lactate) was slurried in 398 g of 5 weight percent aqueous NaOH. The polymer was stirred for 1 hour, whereupon 22.9 g of fumaric acid was added (Fumaric acid is the unepoxidized form of trans-epoxysuccinic acid). The reaction was heated to reflux and stirred for 36 hours. The resulting heterogeneous reaction mixture was cooled to 25° C. and the pH was adjusted to 8.5 using a 15 weight percent aqueous tartaric acid solution. The reaction mixture was filtered and 16.0 g of insoluble residue was collected. The filtrate and supernant were examined by NMR and found to contain only unreacted chitosan, lactic acid, tartaric acid and fumaric acid.

CONTROL EXAMPLE 6

Attempted reaction of chitosan lactate and maleic acid

Following the procedure outlined in Example 3, 25.0 g of Kytamer L (chitosan lactate) was slurried in 398 g of 5 weight percent aqueous NaOH. The polymer was stirred for 1 hour, whereupon 22.9 g of maleic acid was added (Maleic acid is the unepoxidized form of cis-epoxysuccinic acid). The reaction was heated to reflux and stirred for 36 hours. The resulting heterogeneous reaction mixture was cooled to 25° C. and the pH was adjusted to 8.5 using a 15 weight percent aqueous tartaric acid solution. The reaction mixture was filtered and 27.2 g of insoluble residue was collected. The filtrate and supernant were examined by NMR and found to contain only unreacted chitosan, lactic acid, tartaric acid and maleic acid.

CONTROL EXAMPLE 7

Attempted reaction of chitosan with cis-epoxysuccinic acid

An attempt was made to react chitosan (not a chitosan salt) with cis-epoxysuccinic acid. Thus, 7.5 g of Chitosan-2 was slurried with 147.2 g of 5 weight percent aqueous NaOH and the slurry was stirred for 1 hour. Then, 12.3 g of cis-epoxysuccinic acid was added to the reaction and the temperature was brought to 95° C. for 36 hours. The resulting heterogeneous reaction mixture was cooled to room temperature and the pH of the slurry was adjusted to 8.5 using 15 weight percent aqueous tartaric acid solution. The insoluble material was filtered and dried to afford 6.41 g of unreacted chitosan. NMR examination of the filtrate and supernant indicated only chitosan and tartaric acid.

EXAMPLE 8

Reaction of Chitosan lactate with cis-epoxysuccinic acid followed by propylene oxide In a 1000 ml roundbottom flask, 25.0 g (0.10 mol) of Kytamer L was slurried in 158.4 g of a 5% NaOH solution. The slurry was stirred for 1 hr at 25° C. 6.53 g (0.05 mol) of cis-epoxysuccinic acid was added and the reaction was heated to 90° C. and run for 36 hrs. The reactor was than equipped with a condenser chilled to −5° C. and 17.3 g (0.30 mol) of propylene oxide was introduced into the reaction mixture. The reaction temperature was maintained at 90° C. for an additional 36 hrs. The resulting reaction mixture was cooled to 25° C. and the pH was adjusted to 8.5 with a 15% aqueous lactic acid solution. The resulting viscous, homogeneous solution was dialyzed (Spectrum membrane, 1000 MWC) against distilled water for 24 hrs. 1.57 g of insoluble residue was removed by filtration and the resulting solution was freeze-dried to afford 17.5 g of product as white flakes.

CONTROL EXAMPLE 9

Attempted reaction of cis-epoxysuccinic acid following Example 1 of U.S. Pat. No. 4,929,722

To 92 ml of 2-propanol and 48 ml of water was added 20.0 g of Chitosan-2. To this slurry was added 12.0 g of glacial acetic acid in 50 ml of 2-propanol over a 5 minute period. After addition of the acid, 30 ml of water was added and the mixture was stirred for 30 minutes. 54.4 g of 50% aqueous NaOH was added and the mixture was stirred for 90 minutes. 31.7 g of cis-epoxysuccinic acid was added. The viscosity of the reaction became unmanagable as the chitosan appeared to gather into a clump in the reaction vessel. An additional 75 ml of 2-propanol and 39 ml of water had to be added to aid stirring. The reaction was then heated at reflux for 36 hrs.

The resulting heterogeneous reaction mixture, which was lumpy and hardened, was neutralized by addition of 15% aqueous tartaric acid solution. The polymer was filtered and a small portion was ground thoroughly. The ground material was extracted with 2-propanol for 24 hrs in a Soxhlet extractor and dried to afford a pale brown solid which was not soluble to any extent in distilled water.

EXAMPLES 10–14

SUBSTITUTION LEVELS

Following the procedure outlined in Example 3, five additional reactions were run using different substitution levels. The substitution levels of these runs and the products produced in the Examples are shown in Table 1.

TABLE 1

| | | Treatment level verses substitution level[1] | | | |
|---|---|---|---|---|---|
| Example # | Reagent | Treatment level mol/mol amine | M. S. Nitrog | M.S. Oxy | Solubility[2] |
| 2 | cis-epoxysucc | 2.0 | 0.7 | <.02 | soluble |
| 3 | cis-epoxysucc | 2.0 | 0.7 | <.02 | soluble |
| 4 | trans-epoxysuc | 2.0 | 0.2 | <.02 | partial |
| 5 control | fumaric acid | 2.0 | 0.0 | 0.0 | not soluble |
| 6 control | maleic acid | 2.0 | 0.0 | 0.0 | not soluble |
| 7 control | cis-epoxysucc | 2.0 | 0.0 | 0.0 | not soluble |
| 8 | cis-epoxy/p.o. | 0.5/3.0 | 0.12/0.53 | <0.2/0.17 | soluble |
| 10 control | cis-epoxysucc | 0.0 | 0.0 | 0.0 | not soluble |
| 11 | cis-epoxysucc | 0.5 | 0.3 | <.02 | partial |
| 12 | cis-epoxysucc | 1.0 | 0.4 | .02 | soluble |
| 13 | cis-epoxysucc | 1.5 | 0.5 | <.02 | soluble |
| 14 | cis-epoxysucc | 3.0 | 0.7 | <.02 | soluble |

[1]Determined by NMR. See Example 15.
[2]Determined by mixing product at 1% solids at pH 7.0 for 1 hr, filtering and weighing insolubles.

EXAMPLE 15

PRODUCT CHARACTERIZATION

NMR Analysis

NMR spectra of all the samples prepared in these Examples were run on a Bruker AMX-300 spectrometer. The samples were dissolved in pure $D_2O$ or 17 weight percent $CF_3COOD$ when solubility in pure $D_2O$ was negligible or sluggish. In order to facilitate initial assignments, the samples were examined at 55° C. to enhance resolution. At these temperatures, $CF_3COOD$ had an adverse but benign effect on the polysaccharide backbone and the acetyl linkages of the N-acetylglucosamine units. The actual molecular structure of the polymer, particularly the nitrogen-substituted (2-hydroxy-1,2-dicarboxy)ethyl portion remained unaffected by the NMR conditions.

Based on two-dimensional heteronuclear correlation NMR maps, the reaction product of chitosan and cis-epoxysuccinic acid is a long chain random terpolymer containing three monomer units. The monomers vary by substitution onto the glucosamine nitrogen and include: I) saccharide $NHCH(CO_2H)CH(OH)(CO_2H)$, II) saccharide-$NH_2$ and III) saccharide-$NHC(O)CH_3$.

Structure I represents the principle reaction product between cis-epoxysuccinic acid and the —$NH_2$ groups. If the reaction is not stoichiometric with the available —$NH_2$ groups, some remain as part of the final product accounting for some of the residual structure II units. In addition, the alkaline reaction conditions most likely hydrolyze some of the N-acetylglucosamine units from the starting chitosan to afford structure II units. The remaining monomer units are the structure III N-acetylglucosamine units present from the original chitosan starting material.

Using the product from Example 3 as a model, if quantitative NMR results are normalized by using one six-membered ring as a unit, the relative concentration of structure I is found to be 0.66+/−0.03. In other words, 66% of the available —$NH_2$ groups reacted with cis-epoxysuccinic acid to form the expected product I. Residual acetate units III account for 19% and the balance, 15%, is attributed to the structure II units. These assignments were used to calculate expected combustion analysis results. Table 2 lists the complete proton and carbon assignments for the new polymers regardless of substitution levels.

TABLE 2

Assignment of $^1H$ and $^{13}C$ Chemical Shifts[1] of the Reaction Product of cis-epoxysuccinic acid and Chitosan.

| Structure | Carbon location | Proton | Carbon |
|---|---|---|---|
| I | 1 | 5.02 | 98.0 |
| I | 2 | 3.37 | 63.6 |
| I | 3 | 4.08 | 71.0 |
| I | 4 | 3.98 | 77.8 |
| I | 5 | 3.70 | 75.6 |
| I | 6 | 3.70, 3.90 | 61.1 |
| I | 2' | 4.85 | 63.5, 63.6 |
| I | 3' | 4.85 | 69.3, 69.5 |
| II | 1 | 4.86 | 98.6 |
| II | 2 | 3.18 | 56.9 |
| II | 3 | 3.90 | 71.7 |
| III | 1 | 4.58 | 102.2 |
| III | 2 | 3.79 | 56.7 |
| III | 3 | 3.62 | 79.8 |
| III-CH3 | CH3 | 2.04 | 23.0 |

[1]In ppm from external TMS using 17 wt % $CF_3COOD$ at 55° C.

Within the sensitivity of the measurements, double substitution onto the nitrogen did not occur. Also, unambiguous NMR evidence of substitution onto the available oxygens is not apparent. In order to confirm whether cis-epoxysuccinic acid might be reacting with the available hydroxy groups, a reaction was run following the same conditions as described in Example 3 only 25.0 g of Polymer JR® was substituted for the chitosan salt. Polymer JR is a cellulose polysaccharide which varies from chitosan in that the amino group present at the number 2 carbon in chitosan is replaced by a hydroxy group. Polymer JR is a form of cellulose rendered water soluble by derivatization with ethylene oxide and a quaternary nitrogen containing derivative. After running the reaction for 36 hours, cooling and neutralizing the homogeneous reaction mixture, the product was dialyzed for 24 hours against distilled water. The resulting solution was freeze-dried and 17.3 g of solid material was collected. NMR examination of the resultant material showed only Polymer JR and tartaric acid. The reagent does not appear to react under these conditions with polysaccharides which do not contain reactive amino groups.

IR Analysis

FT-IR spectra of the product isolated from Example 3 were run on a solid sample isolated by filtration from a solution adjusted to pH 2.0 by 1 molar aqueous HCl, and on a solution and film of the polymer in $H_2O$ at pH 10.0. The FT-IR spectra were recorded on a Bio-Rad FTS-60 FT-IR spectrometer. The solid sample was recorded using a KBr pellet. The liquid sample spectrum was run using a CIRCLE® cell. The film was cast onto AgCl discs for analysis.

The solid state and solution spectra at pH 10.0 were found to be very similar as far as the main bands are concerned. However, there were differences in terms of relative band intensities and shifts in peak positions. These are expected due to changes in hydrogen-bonding with water molecules in the solution state. The $CO_2$-stretching band is observed to be the most intense band at pH 10.0. In the film, it appears at 1601 reciprocal centimeters ($cm^{-1}$) while in solution it is shifted to 1591 $cm^{-1}$. The bands in the cast film observed at 3352 and, 2930 and 2880 $cm^{-1}$ are assigned to OH and CH stretching vibrations, respectively. The CH bending bands are observed at 1460, 1384, and 1313 $cm^{-1}$ in the film and at 1437, 1389, and 1321 $cm^{-1}$ in solution. The C—O stretching bands, usually very intense in the IR spectra, are intense and are observed at 1114, 1072 and 1030 $cm^{-1}$ in the cast film and at 1115, 1070 and 1032 $cm^{-1}$ in solution. The NH stretching bands, usually observed in the 3200–3400 $cm^{-1}$ region probably overlap with the OH stretching bands. However, the NH bending bands, expected in the 1500–1580 $cm^{-1}$ region, are not observed. This shows that the NH species may not be significant at pH 10.0.

The solid state spectrum of the material isolated at pH 2.0 shows bands due to $NH_2+$ groups. Rather broad bands in the 2600–3000 and 2250–2700 $cm^{-1}$ regions are assignable to the $NH_2+$ stretching bands and the intense band at 1640 $cm^{-1}$ is due to the $NH_2+$ bending. The OH and CH stretching bands are observed at 3424 and, 2943 and 2885 $cm^{-1}$, respectively. The acetal C=O stretching band is clearly defined at 1733 $cm^{-1}$. The CH bending bands are observed at 1380, 1319 and 1240 $cm^{-1}$. In addition, the spectrum shows bands due to acid salt species at 3250, 1560 and 1430 $cm^{-1}$. The precise nature of these species can not at present be defined on the basis of FT-IR spectra alone.

TABLE 3

Combustion Analysis
Combustion data for various Examples

| Example No. | Treatment level (molar)[1] | Carbon Expected[2] | Carbon Found[3] | Hydrogen Expected | Hydrogen Found | Nitrogen Expected | Nitrogen Found |
|---|---|---|---|---|---|---|---|
| 1[4] | 1.0 | 41.92 | 43.26 | 4.85 | 6.89 | 4.73 | 5.14 |
| 2 | 2.0 | 41.92 | 33.52 | 5.58 | 4.91 | 5.72 | 3.53 |
| 3 | 2.0 | 42.73 | 38.29 | 5.66 | 6.02 | 5.77 | 4.68 |
| 4 | 2.0 | 44.38 | 39.90 | 6.47 | 5.80 | 7.62 | 5.68 |
| 10 control | 0.0 | 45.11 | 47.07 | 6.81 | 7.60 | 8.42 | 7.45 |
| 11 | 0.5 | 44.09 | 36.91 | 6.35 | 5.83 | 7.36 | 4.81 |
| 12 | 1.0 | 43.55 | 35.04 | 6.02 | 4.45 | 6.76 | 2.17 |
| 13 | 1.5 | 42.99 | 39.98 | 5.83 | 5.75 | 6.17 | 4.77 |
| 14 | 3.0 | 42.43 | 37.86 | 5.57 | 5.31 | 5.59 | 4.60 |

[1]. Moles of cis-epoxysuccinic acid per mole of glucosamine monomer.
[2]. Expected values were calculated by % relative contribution of each monomer species [—NHR, —$NH_2$, —$NHC(O)CH_3$] as determined by NMR.
[3]. Determined on a dry basis.
[4]. Expected values for Example 1 were determined by % relative contribution of each component based on weight gain.

Although the invention has been described with respect to specific aspects, those skilled in the art will recognize that other aspects of the invention are intended to be included in the scope of the claims which follow.

I claim:

1. A polyglucosamine derivative containing free amine groups wherein at least a portion of said amine groups are substituted with an oxirane carboxylic acid in an amount of from about 0.05 to 1.0 mole of said oxirane carboxylic acid per mole of glucosamine monomer unit.

2. The derivative of claim 1 wherein at least 50 percent of the amine groups in the polyglucosamine are free amine groups.

3. The derivative of claim 1 wherein the polyglucosamine is a poly(N-acetylglucosamine) which is from about 50 percent to 100 percent deacetylated.

4. The derivative of claim 3 wherein the polyglucosamine is a poly(N-acetylglucosamine) which is from about 70 percent to 99 percent deacetylated.

5. The derivative of claim 1 wherein the polyglucosamine is selected from the group consisting of chitin, chitosan and mixtures thereof.

6. The derivative of claim 1 wherein the polyglucosamine has a weight average molecular weight of from about 1,000 to 3,000,000 grams per gram mole.

7. The derivative of claim 1 wherein the oxirane carboxylic acid has from 3 to about 6 carbon atoms per molecule.

8. The derivative of claim 1 wherein the oxirane carboxylic acid is a dicarboxylic acid.

9. The derivative of claim 8 wherein the oxirane carboxylic acid is selected from the group consisting of cis-epoxysuccinic acid, trans-epoxysuccinic acid and mixtures thereof.

10. The derivative of claim 1 wherein the molar substitution of the oxirane carboxylic acid is from about 0.2 to 1.0 mole of oxirane carboxylic acid per mole of glucosamine monomer unit.

11. The derivative of claim 1 wherein the oxirane carboxylic acid is ionically bonded or covalently bonded to the polyglucosamine.

12. N-[(2-hydroxy-1,2-dicarboxy)ethyl]chitosan having from about 0.2 to 1.0 mole of (2-hydroxy-1,2-dicarboxy) ethyl groups per glucosamine monomer unit in the chitosan.

13. The chitosan of claim 12 which has a weight average molecular weight of from about 1000 to 2,000,000 grams per gram mole.

14. A composition comprising:
   (i) from about 0.1 to 99.9 weight percent of the derivative of claim 1; and
   (ii) from about 0.1 to 99.9 weight percent of an organic acid selected from the group consisting of tartaric acid, lactic acid, acetic acid, glycolic acid, pyrrolidone carboxylic acid and mixtures of said acids or salts thereof.

15. The composition of claim 14 further comprising from about 1 to 90 weight percent water based on the total weight of the composition.

16. The composition of claim 15 comprising:
   (i) from about 0.05 to 30 weight percent of the derivative of claim 1;
   (ii) from about 0.1 to 15 weight percent of an organic acid selected from the group consisting of tartaric acid, lactic acid, acetic acid, glycolic acid, pyrrolidone carboxylic acid and mixtures of said acids or salts thereof; and
   (iii) from about 55 to 99.94 weight percent water.

* * * * *